D. C. LOHMANN.
ROSIN CAKE.
APPLICATION FILED AUG. 21, 1913.

1,098,277.  Patented May 26, 1914.

WITNESSES
Edw. Thorpe

INVENTOR
D. C. Lohmann
BY
ATTORNEYS

UNITED STATES PATENT OFFICE.

DIN CHRIS LOHMANN, OF WEST MILTON, OHIO.

ROSIN CAKE.

1,098,277.

Specification of Letters Patent.  Patented May 26, 1914.

Application filed August 21, 1913. Serial No. 786,046.

*To all whom it may concern:*

Be it known that I, DIN C. LOHMANN, a citizen of the United States, and a resident of West Milton, in the county of Miami and State of Ohio, have invented a new and Improved Rosin Cake, of which the following is a full, clear, and exact description.

My invention relates to a cake of rosin for use in connection with the bows of stringed musical instruments, and it is a design of my invention to provide a rosin cake having sections of soft and hard rosin, the soft rosin serving to hold the hard rosin to the bow. In the preferred form I furthermore incorporate bluing in the soft sections of the cake, so that the application of the rosin will whiten the bow. Also, it is desirable in practice, that the sections be so arranged that the soft sections will be confined by the hard sections.

Reference is to be had to the accompanying drawings forming a part of this specification, in which similar characters of reference indicate corresponding parts in both views.

Figure 1:
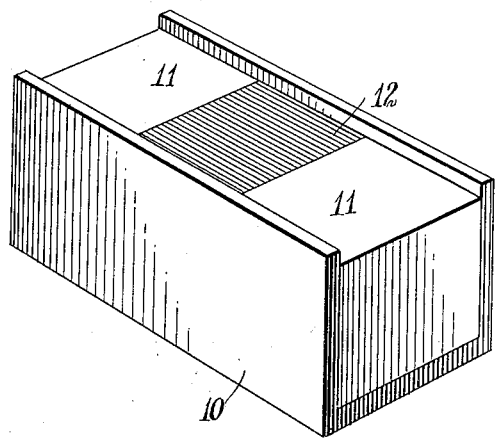
Figure 2:
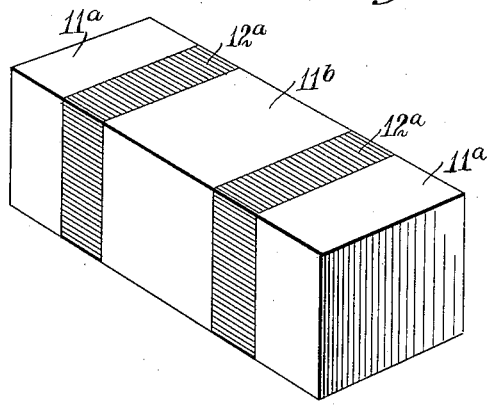

Figure 1 is a perspective view of a rosin cake formed in accordance with my invention, showing the same in the usual open ended box; and Fig. 2 is a perspective view of the cake in a slightly modified form.

In the form shown in Fig. 1 the rosin cake is shown molded in a box 10 and comprises two end sections 11 of hard rosin, and an intermediate section 12 of soft rosin. By the arrangement, the end sections 11 of the hard rosin serve to confine the soft rosin and maintain its form.

In the form shown in Fig. 2, there are end sections 11$^a$ of hard rosin, a central larger section 11$^b$ of hard rosin, and alternating with the hard sections are sections 12$^a$ of soft rosin. The sections 12$^a$ are designed to be of softer rosin than the single section 12, it being my purpose to make up cakes having layers of different degrees of softness, and the softer sections are desirably smaller in order that they may better maintain their form.

In both forms it will be observed that the hard sections are at the ends and confine the soft sections. Furthermore, in practice, I incorporate bluing in the soft sections so that the application of the rosin to the bow will whiten the latter. The use of the softer rosin also prevents, as far as possible, the dusting of the instrument.

The rosin is applied to the bow in the usual manner, and the soft rosin will the more readily adhere to the bow and will, in turn, serve to cause the hard rosin to better adhere.

Having thus described my invention, I claim as new, and desire to secure by Letters Patent:

1. A rosin cake, comprising sections of relatively hard and soft rosin.

2. A rosin cake, comprising end sections of hard rosin, and an intermediate section of relatively soft rosin.

3. A rosin cake, comprising sections of relatively hard and soft rosin, the soft rosin having bluing incorporated therein.

In testimony whereof I have signed my name to this specification in the presence of two subscribing witnesses.

DIN CHRIS LOHMANN.

Witnesses:
J. C. ANDERSON,
H. C. THURMAN.

Copies of this patent may be obtained for five cents each, by addressing the "Commissioner of Patents, Washington, D. C."